United States Patent
Hodrus

(10) Patent No.: US 10,385,935 B2
(45) Date of Patent: Aug. 20, 2019

(54) METHOD FOR INCREASING THE AVAILABILITY OF A HYBRID SEPARATING CLUTCH IN A HYBRID DRIVE TRAIN OF A MOTOR VEHICLE

(71) Applicant: Schaeffler Technologies AG & Co. KG, Herzogenaurach (DE)

(72) Inventor: Erhard Hodrus, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 128 days.

(21) Appl. No.: 15/022,366

(22) PCT Filed: Nov. 19, 2014

(86) PCT No.: PCT/DE2014/200647
§ 371 (c)(1),
(2) Date: Mar. 16, 2016

(87) PCT Pub. No.: WO2015/090307
PCT Pub. Date: Jun. 25, 2015

(65) Prior Publication Data
US 2017/0016495 A1    Jan. 19, 2017

(30) Foreign Application Priority Data
Dec. 17, 2013  (DE) .......... 10 2013 226 256

(51) Int. Cl.
*B60K 6/387* (2007.10)
*F16D 25/00* (2006.01)
*F16D 48/06* (2006.01)

(52) U.S. Cl.
CPC ............ *F16D 48/066* (2013.01); *B60K 6/387* (2013.01); *B60Y 2200/92* (2013.01);
(Continued)

(58) Field of Classification Search
CPC ....... B60K 6/387; B60W 20/00; B60W 10/08; B60W 10/06; Y02T 10/6286; Y02T 6/445
(Continued)

(56) References Cited

U.S. PATENT DOCUMENTS

| 7,160,225 B2 | 1/2007 | Berger et al. |
| 2013/0225361 A1* | 8/2013 | Gupta ................. B60W 10/105 477/3 |

(Continued)

FOREIGN PATENT DOCUMENTS

| DE | 102008042970 | 4/2010 |
| DE | 102010037424 | * 3/2012 |

(Continued)

*Primary Examiner* — Maceeh Anwari
(74) *Attorney, Agent, or Firm* — Volpe and Koenig, P.C.

(57) ABSTRACT

The invention relates to a method for increasing the availability of a hybrid separating clutch in a hybrid drive train of a motor vehicle, wherein the hybrid separating clutch is disposed between an internal combustion engine and an electric traction drive. In the method where even in the event of a fault the motor vehicle continues to be driven, the hybrid separating clutch is controlled by a hydrostatic actuator, and when a malfunction of the hydrostatic actuator is detected, for actuation of the hybrid separating clutch which is engaged in the non-actuated state, the last state of the hydrostatic actuator detected by a control mechanism is used for estimation of a minimum clutch torque which can be transmitted.

12 Claims, 2 Drawing Sheets

(52) U.S. Cl.
CPC ..... *B60Y 2300/182* (2013.01); *B60Y 2300/42* (2013.01); *B60Y 2300/91* (2013.01); *B60Y 2400/406* (2013.01); *F16D 25/00* (2013.01); *F16D 2500/1026* (2013.01); *F16D 2500/1066* (2013.01); *F16D 2500/10412* (2013.01); *F16D 2500/302* (2013.01); *F16D 2500/3024* (2013.01); *F16D 2500/3026* (2013.01); *F16D 2500/30406* (2013.01); *F16D 2500/501* (2013.01); *F16D 2500/5104* (2013.01); *F16D 2500/5114* (2013.01); *F16D 2500/70408* (2013.01); *F16D 2500/70434* (2013.01); *F16D 2500/70458* (2013.01); *F16D 2500/70689* (2013.01); *Y10S 903/914* (2013.01); *Y10S 903/946* (2013.01)

(58) Field of Classification Search
USPC .......................................................... 701/22
See application file for complete search history.

(56) References Cited

U.S. PATENT DOCUMENTS

2013/0325231 A1    12/2013  Park
2014/0067174 A1     3/2014  Park

FOREIGN PATENT DOCUMENTS

| DE | 102010042916 A1 | 4/2012 |
| DE | 102012224278 | 3/2014 |
| EP | 1497151 B1 * | 4/2003 |
| EP | 1547850 | 6/2005 |
| WO | 03086804 | 10/2003 |

* cited by examiner

METHOD FOR INCREASING THE AVAILABILITY OF A HYBRID SEPARATING CLUTCH IN A HYBRID DRIVE TRAIN OF A MOTOR VEHICLE

BACKGROUND

The invention relates to a method for increasing the availability of a hybrid separating clutch in a hybrid drive train of a motor vehicle, in which the hybrid separating clutch is arranged between an internal combustion engine and an electric traction drive.

A method is known from EP 1 497 151 B1 for operating a motor vehicle with a drive engine and a transmission in the drive train. Here, a separating clutch is arranged between the drive engine and the transmission, which is actuated by a hydrostatic actuator. The hydrostatic actuator here allows the torque transmission to be carried out by the separating clutch. The control of the hydrostatic actuator occurs via a control unit, which comprises a control and power electronic controlling the drive motor of the actuator, for example an electric motor. In order to address the separating clutch the drive device is connected to additional sensors, with furthermore signal connections to other electronic units being provided, for example a superimposed control device such as a motor electronic, an anti-lock braking system, or a traction control.

When such a separating clutch actuated by a hydrostatic actuator is used in a hybrid drive system, it is arranged between the internal combustion engine and an electric traction drive. The electric traction drive is here used to set the hybrid vehicle in motion without using the internal combustion engine. When driving with the internal combustion engine the torque can be increased with an electric motor of the electric traction drive by the electric motor being operated in a motorized fashion. The electric motor may also be used to charge a battery in the generator mode and to operate the internal combustion engine in a range with higher effectiveness.

The hydrostatic actuator is self-locking for pressures of a hydraulic medium up to approximately 25 bars. This means that electrically no energy needs to be applied to hold the system in its actuated position because the pressure in this hydraulic system is usually below this threshold. In case of a failure of the hydrostatic actuator the clutch remains in its previous position so that situations may develop in which a continued driving with the hybrid vehicle is no longer possible.

SUMMARY

The invention is therefore based on the objective to ensure a method for increasing the availability of the hybrid separating clutch in case of malfunctions of the clutch actuating system.

The objective is attained according to the invention such that the hybrid separating clutch is addressed via a hydrostatic actuator, with in case of a detected malfunction of the hydrostatic actuator being detected for the operation of the hybrid separating clutch closed in the non-actuated state, the most recent state of the hydrostatic actuator detected by a control device is used for estimating a minimal clutch torque that can be transmitted. Via this minimal clutch torque that can be transmitted it shall be ensured that the hybrid vehicle is still kept in the driving operation.

Advantageously the malfunction is detected in that the hydrostatic actuator, connected via a communication connection by which it is connected to the control device, fails to answer, with here from a present speed of the hydrostatic actuator and the position of the hybrid separating clutch at the time the communication fails the minimum torque of the hybrid separating clutch is determined that can be transmitted. Here it is assumed that although the communication connection to the hydrostatic actuator is disturbed, the hydrostatic actuator itself is still operational so that the hybrid separating clutch can still be actuated. The minimal clutch torque that can be transmitted is here adjusted such that the hybrid separating clutch transmits a clutch torque and thus continued driving of the hybrid drive is possible.

In an alternative the detected malfunction represents a component of the hydrostatic actuator failing, with the hybrid separating clutch being closed as a function of the failed component and here preferably from the present speed of the hydrostatic actuator and the position of the hybrid separating clutch at the time of the component failure the minimum clutch torque of the hybrid separating clutch is determined that can be transmitted. Here it is differentiated which part of the hydrostatic actuator is no longer operational and depending on this differentiation another addressing of the hybrid separating clutch is performed.

In a variant, the minimum clutch torque that can be transmitted is transmitted from a transmission control device, connected to the hydrostatic actuator and detecting the malfunction, to a superordinate control device together with a status signal for the minimum clutch torque that can be transmitted. The superordinate control device, which particularly also controls the internal combustion engine and the electric motor of the electric traction drive, is therefore provided with the respective information in order to keep the hybrid vehicle in operation. The status information allows the superordinate control device to assess the reliability of the minimum clutch torque that can be transmitted as suggested by the transmission control device.

In a further development the status signal is set to a "certain" value when the minimum clutch torque that can be transmitted is equivalent to a maximum clutch torque. This signals to the superordinate control device that driving can continue in normal operation.

In an alternative the status signal is set to an "estimated" value when the minimum clutch torque that can be transmitted is below the maximum clutch torque. This information represents for the superordinate control device that the control of the hybrid drive must occur with particular sensitivity.

In one variant, at a status signal with the "estimated" value, by monitoring the slippage in the hybrid separating clutch between the internal combustion engine and the electric motor of the electric traction drive the superordinate control device determines the maximum clutch torque in case of an increase of the clutch torque in order to allow continued operation of the hybrid vehicle.

Advantageously, the electric motor of the electric traction drive operates during the determination of the maximum clutch torque by the superordinate control device in a generator operating mode. This ensures that the electric motor generates energy which is saved in a battery and is made available for driving in the motoric operation of the electric motor.

In one embodiment the superordinate control device limits a torque of the internal combustion engine such that no excess slippage develops at the hybrid separating clutch. This ensures that torque is transmitted only to an extent absolutely necessary, with the driving experience sensed by the driver not being influenced by the slippage.

In one variant the superordinate control device selects a gear speed in a transmission arranged downstream such that the speed of the internal combustion engine allows charging a battery of the electric motor of the electric traction drive.

BRIEF DESCRIPTION OF THE DRAWINGS

The invention allows numerous embodiments. One of these embodiments will be explained in greater detail based on the figures shown in the drawings.

Shown are.

DETAILED DESCRIPTION OF THE PREFERRED EMBODIMENTS

Figure 1:
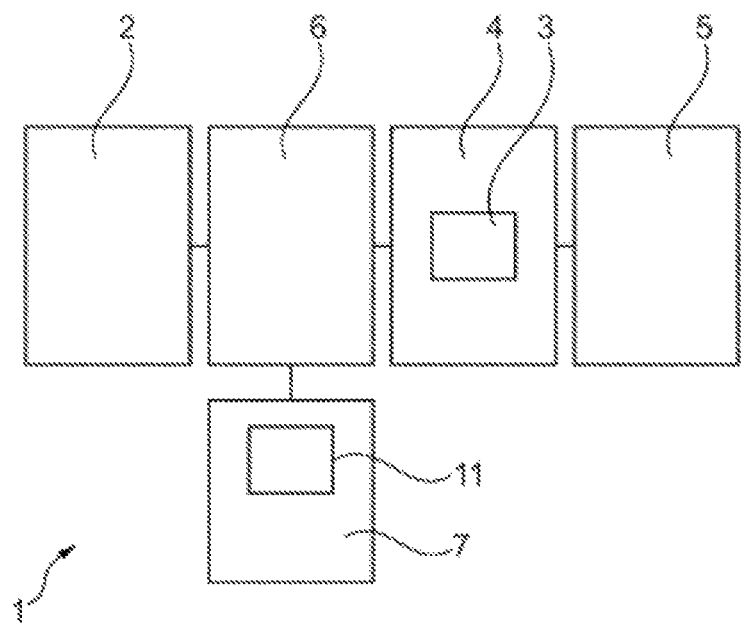
FIG. 1 a schematic diagram of an arrangement of a hybrid separating clutch in a hybrid drive.

Identical features are marked with the same reference characters.

FIG. 1 shows a schematic diagram of the principle of a hybrid drive 1 as used in hybrid vehicles. The hybrid drive 1 comprises here an internal combustion engine 2 and an electric motor 3, arranged in an electric traction drive 4. The electric traction drive 4 is connected to a transmission 5. A hybrid separating clutch 6 is arranged between the electric motor 3 of the electric traction drive 4 and the internal combustion engine 2, which is actuated by a hydrostatic actuator 7. Such a hydrostatic actuator 7 comprises a clutch control device 8 which via a communication line 12 is connected to a transmission control device 9, and an electric motor 11 which is activated for controlling the hybrid separating clutch 6 based on signals of the clutch control device 8. With regards to the actualized design and functionality of the hydrostatic actuator 7 reference is made to EP 1 497 151 B1.

Figure 2:
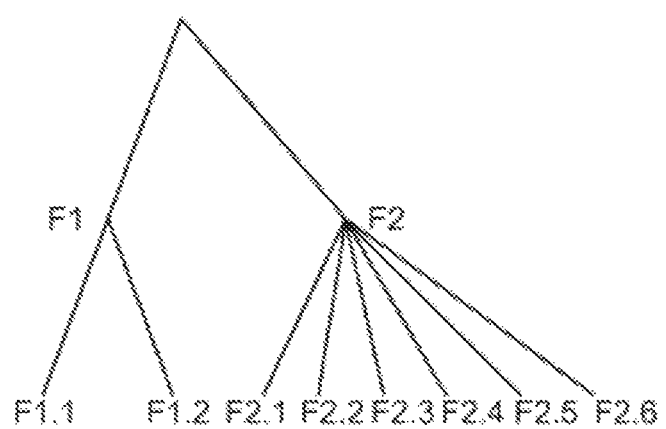
FIG. 2 a fault tree for potential malfunctions of a hydrostatic actuator when operating a hybrid separating clutch.

Such a hydrostatic actuator 7 can malfunction for various reasons. Potential errors leading to a failure of the hydrostatic actuator 7 are shown in the error tree according to FIG. 2. Here it is distinguished between two groups of errors. The error group F1 relates to errors by a missing communication connection. In case of a missing communication connection the transmission control device 9 assumes that the hydrostatic actuator 7 fails to respond. In this error group F1 three different errors need to be discussed. The first error F1.1 may comprise that the communication line 12 is interrupted, which is embodied as a CAN-connection line extending between the clutch control device 8 of the hydrostatic actuator 7 and the transmission control device 9. In this case it is assumed that the hydrostatic actuator 7 still flawlessly operates mechanically and electrically. However, the clutch control device 8 of the hydrostatic actuator 7 receives no CAN-signals from the transmission control device 9 and consequently initiates an error reaction by completely opening the hydrostatic actuator 7 and this way completely closes the hybrid separating clutch 6.

Another error F1.2 may be given in that the supply voltage at the hydrostatic actuator 7 is no longer applied. A third error F1.3 of this group F1 may be given in an error in the computer of the clutch control device 8 of the hydrostatic actuator 6 so that it shuts down.

The second error group F2 relates to a failing component within the hydrostatic actuator 7. Here, six errors are distinguished. The first error F2.1 is given in a malfunctioning pressure sensor. The software on the hydrostatic actuator 7 detects this error and reports it to the transmission control device 9. The hydrostatic actuator 7 can be opened completely without problems and the hybrid separating clutch 6 can therefore be closed completely. In the second error F2.2 the absolute path sensor malfunctions. Here, too the software detects this error on the hydrostatic actuator 7 and reports it to the transmission control device 9. The hydrostatic actuator 7 can still be opened completely by evaluating Hall-signals and the hybrid separating clutch 6 can therefore be closed completely, allowing the maintaining of the drive operation. In the third error F2.3 the Hall-sensors have failed. The software on the hydrostatic actuator 7 detects this error and reports it to the transmission control device 9. A normal motor operation is no longer possible, though. The opening of the hybrid separating clutch 6 can occur by addressing the electric motor 11 of the hydrostatic actuator 7 as a step motor without requiring any direct measurement. Via the absolute path sensor it can be checked where the electric motor 11 of the hydrostatic actuator 7 is located at this specific time and if an opening of the hybrid separating clutch 6 was successful. Another error F2.4 may be given in that one or more windings of the electric motor 11 of the hydrostatic actuator 7 are interrupted so that the electric motor 11 of the hydrostatic actuator 7 cannot move any more. The present position of the hybrid separating clutch 6 can be detected by the absolute path sensor and reported to the transmission control device 9.

Based on an error F2.5 the hydrostatic actuator 7 cannot be moved any more mechanically, which can also be detected via the absolute path sensor and reported to the transmission control device 9. In the error F2.6 the temperature sensors have failed. Here, only a last closing of the hybrid separating clutch 6 can be initiated by opening the hydrostatic actuator 6.

Figure 3:
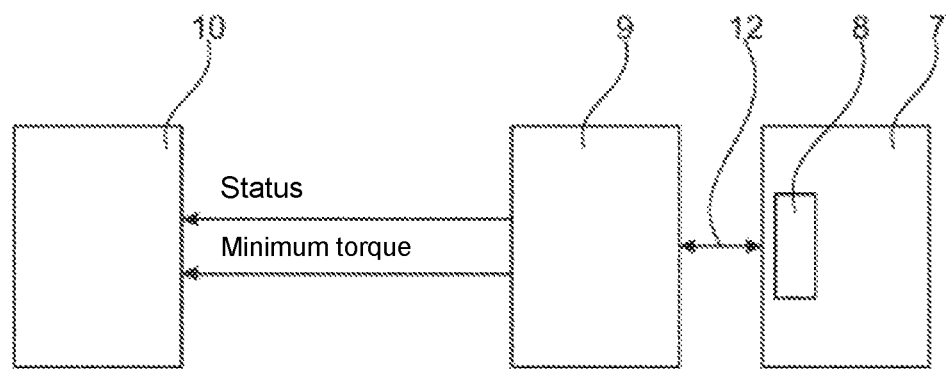
FIG. 3 a schematic diagram for the method according to the invention.

As already described, in the individual error cases of the group F2 it can be reported very safely by the transmission control device 9 to a superordinate control device 10 if and to what extent the hybrid separating clutch 6 is closed. The connection of the superordinate control device 10 is shown in FIG. 3, in which the clutch control device 8 of the hydrostatic actuator 7 is connected via the transmission control device 9 to the superordinate control device 10. In case an error is detected, the transmission control device 9 reports a minimum clutch torque to the superordinate control device.

For all errors of the group F1 it applies that the superordinate control device 10 detects that the hydrostatic actuator 7 fails to respond. From the speed of the hydrostatic actuator 7 and the position of the hybrid separating clutch 6 at the time of the failure the transmission control device 9 can perform an estimation for the clutch torque that can be minimally transmitted, which shall be explained in two examples.

Example 1: It is assumed that the hydrostatic actuator 7 is stationary. The hybrid separating clutch 6 has transmitted for example a clutch torque of 50 Nm at the last time the communication was operational. At this point of time an error of the group F1 occurs. For example, this last clutch torque of 50 Nm can be reported as the estimated clutch torque that can be transmitted by the transmission control device 9 to the superordinate control device 10.

Example 2: When the hydrostatic actuator 7 opens at the time of the failure representing an error described in the group F1 and thus the hybrid separating clutch 6 closes with a certain torque gradient, the clutch torque is still increased from the clutch torque already reached at the time of the failure, e.g., 50 Nm. The clutch torque of e.g., 80 Nm can then be reported by the transmission control device 9 to the superordinate control device 10 as the clutch torque that can be minimally transmitted. The same applies for closing the hydrostatic actuator 7. Here, then e.g., a clutch torque of 20 Nm could be reported to the superordinate control device 10 as the clutch torque that can be minimally transmitted.

In case of errors occurring in the context with the second group F2, an estimation for the clutch torque that can be minimally transmitted it insufficient, though. In this case, additionally a status of the clutch torque must be set to the "certain" or "estimated" values. In the context with the clutch torque that can be minimally transmitted the status is then transmitted by the transmission control device 9 to the superordinate control device 10.

If the status is "certain" the estimated clutch torque that can minimally be transmitted is equivalent to the maximum clutch torque that can be transmitted by the hybrid separating clutch 6. In case of the status "estimated" the minimum clutch torque that can be transmitted is below the maximum clutch torque that can be transmitted. In this case, the superordinate control device 10 must determine independently the amount of clutch torque that maximally can be transmitted by monitoring the slippage of the hybrid separating clutch 6 between the internal combustion engine 2 and the electric motor 3 of the electric traction drive 4 by an increase of the torque at the internal combustion engine 2. The electric motor 3 can here be operated in generator mode. If during the increase of the torque the slippage at the hybrid separating clutch 6 increases considerably at the internal combustion engine 2 and can only be reduced by lowering the torque of the internal combustion engine 2, then the limit for the maximum clutch torque has been found.

The superordinate control device 10 fulfills the following tasks during the measures for increasing the availability of the hybrid separating clutch 6. The torque of the internal combustion engine 2 must be appropriately limited by the superordinate control device 10 to prevent excess slippage developing at the hybrid separating clutch 6. Due to the fact that the superordinate control device 10 usually requests the clutch torque to be transmitted, by monitoring the slippage it must be detected if the torque of the internal combustion engine 2 exceeds the clutch torque that can actually be yielded and the hybrid separating clutch 6 could be damaged thereby.

As a second objective, the superordinate control device 10 must select the gear speed in the downstream connected transmission 5 such that internal combustion engine speeds as high as possible are yielded, which benefits the charging of a battery of the electric motor 3 for driving. This is independent from the fact if the internal combustion engine 2 is or is not started via the electric motor 3 or an additional starter motor.

If it is detected for example that the maximum clutch torque is so low that it is insufficient for starting the hybrid vehicle but sufficient for driving at reduced speeds, then the electric motor 3 of the electric traction drive 4 must be additionally used to allow starting the driving operation. In order to allow several consecutive starts of driving it must be ensured that the battery of the electric motor 3 is charged.

LIST OF REFERENCE CHARACTERS 1 hybrid drive
2 internal combustion engine
3 electric motor
4 electric traction drive
5 transmission
6 hybrid separating clutch
7 hydrostatic actuator
8 clutch control device
9 transmission control device
10 superordinate control device
11 electric motor of the hydrostatic actuator
12 communication line

The invention claimed is:

1. A method for increasing an availability of a hybrid separating clutch in a hybrid drive train of a motor vehicle, in which the hybrid separating clutch is arranged between an internal combustion engine and an electric traction drive, the method comprising:
controlling the hybrid separating clutch via a hydrostatic actuator,
detecting an error of the hydrostatic actuator, wherein the hybrid separating clutch is closed in an idle state,
using a most recent status of the hydrostatic actuator detected by a control device to estimate a minimal clutch torque configured to maintain a driving operation, wherein the minimal clutch torque is less than a maximum clutch torque,
transmitting the minimal clutch torque from the control device to a superordinate control device jointly with a status signal associated with the minimal clutch torque, wherein the control device is connected to the hydrostatic actuator and detects the error, and
setting the status signal to an estimated value,
wherein in case of the status signal being set to the estimated value, the superordinate control device determines the maximum clutch torque by monitoring a slippage between the internal combustion engine and an electric motor of the electric traction drive while increasing the minimal clutch torque.

2. The method according to claim 1, wherein the hydrostatic actuator fails to respond via a communication connection that connects the hydrostatic actuator to the control device, and determining the minimal clutch torque based on a present speed of the hydrostatic actuator and a position of the hybrid separating clutch when a communication fails.

3. The method according to claim 1, wherein a malfunction is detected in a failing component of the hydrostatic actuator, and determining the minimal clutch torque based on a present speed of the hydrostatic actuator and a position of the hybrid separating clutch given when the failing component malfunctions.

4. The method according to claim 1, further comprising operating the electric motor of the electric traction drive in a generator mode during the determination of the maximum clutch torque.

5. The method according to claim 1, wherein the superordinate control device limits a torque of the internal combustion engine such that only minor slippage develops at the hybrid separating clutch.

6. The method according to claim 1, wherein the superordinate control device selects a gear speed in a downstream arranged transmission such that a speed of the internal combustion engine allows charging a battery of an electric motor of the electric traction drive.

7. A method for increasing an availability of a hybrid separating clutch in a hybrid drive train of a motor vehicle, in which the hybrid separating clutch is arranged between an internal combustion engine and an electric traction drive, the method comprising:

controlling the hybrid separating clutch via a hydrostatic actuator, detecting an error of the hydrostatic actuator, wherein the hybrid separating clutch is closed in an idle state, using a most recent status of the hydrostatic actuator detected by a control device to estimate a minimal clutch torque for maintaining a driving operation, transmitting the minimal clutch torque from the control device to a superordinate control device jointly with a status signal associated with the clutch torque that minimally is to be transmitted, wherein the control device is connected to the hydrostatic actuator and detects the error, setting the status signal to an estimated value when the minimal clutch torque is lower than a maximum clutch torque, wherein in case of the status signal being set to the estimated value, the superordinate control device determines the maximum clutch torque by monitoring a slippage between the internal combustion engine and an electric motor of the electric traction drive while increasing the minimal clutch torque.

8. The method according to claim 7, wherein the hydrostatic actuator fails to respond via a communication connection that connects the hydrostatic actuator to the control device, and determining the minimal clutch torque based on a present speed of the hydrostatic actuator and a position of the hybrid separating clutch when a communication fails.

9. The method according to claim 7, wherein a malfunction is detected in a failing component of the hydrostatic actuator, and determining the minimal clutch torque based on a present speed of the hydrostatic actuator and a position of the hybrid separating clutch given when the failing component malfunctions.

10. The method according to claim 7, further comprising operating the electric motor of the electric traction drive in a generator mode during the determination of the maximum clutch torque.

11. The method according to claim 7, wherein the superordinate control device limits a torque of the internal combustion engine such that only minor slippage develops at the hybrid separating clutch.

12. The method according to claim 7, wherein the superordinate control device selects a gear speed in a downstream arranged transmission such that a speed of the internal combustion engine allows charging a battery of an electric motor of the electric traction drive.

\* \* \* \* \*